(No Model.)
C. ROWLAND.
POWER AND SPEED REGULATOR.
No. 335,541. Patented Feb. 2, 1886.
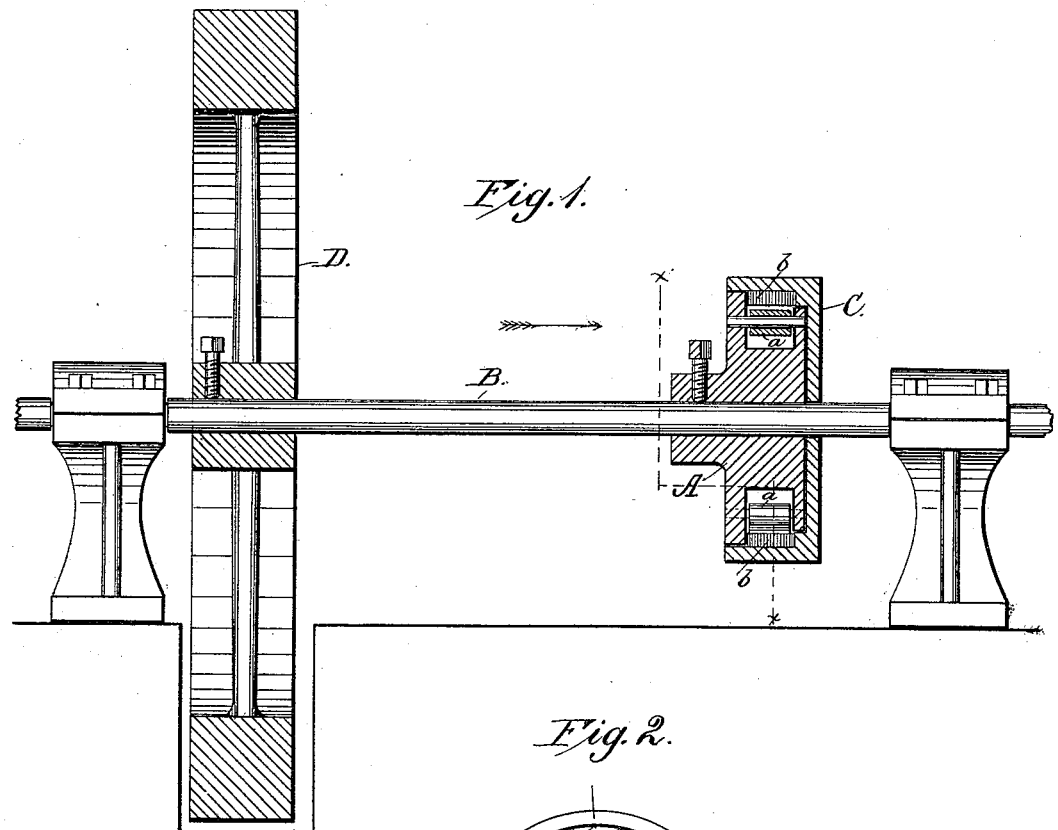
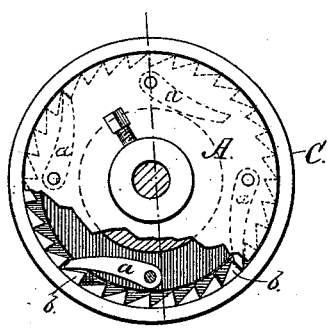
WITNESSES:
W. W. Hollingsworth
Edw. H. Byrn
INVENTOR:
C. Rowland
BY Munn & Co.
ATTORNEYS.

UNITED STATES PATENT OFFICE.

CHRISTIAN ROWLAND, OF LANARK, ILLINOIS.

POWER AND SPEED REGULATOR.

SPECIFICATION forming part of Letters Patent No. 335,541, dated February 2, 1886.

Application filed November 17, 1885. Serial No. 183,135. (No model.)

*To all whom it may concern:*

Be it known that I, CHRISTIAN ROWLAND, of Lanark, in the county of Carroll and State of Illinois, have invented a new and useful Improvement in Power and Speed Regulators, of which the following is a description.

Figure 1 is a sectional side elevation of the device, and Fig. 2 is a section through the line $x\ x$.

My invention is in the nature of a device for regulating the power or speed of machines run by hand or horse power, or other varying and irregular power; and it consists in the combination of a ratchet-clutch mechanism, a driven shaft, and a fly-wheel rigidly fixed to the shaft at a point between the driver-section of the clutch and the point of utilization of the power, as hereinafter described.

In the drawings, A represents a flanged hub, which is rigidly fastened to a shaft, B, by a set-screw or other device. Between the flanges of this hub are loosely hinged the pawls $a\ a$. Turning loosely on the shaft, and covering the hub with its pawl or pawls, is a cup-shaped wheel, C, whose inner periphery is wrought into ratchet-teeth $b$. The outer face or periphery of this wheel is made as a smooth band-pulley; but it may be a toothed wheel, or any other form of driving-wheel. On the shaft B is secured rigidly a fly-wheel, D. Now, it being borne in mind that the wheel C is the driver or source of power, and the shaft B is connected with the driven machinery or point of utilization of power, it will be seen that wherever the speed of the wheel C exceeds that of the shaft the ratchet-teeth $b$ of said wheel engage the pawls of the hub and transmit the power to the shaft, but when from any cause the speed of wheel C falls off from the slacking up of the horse or other power the momentum of the fly-wheel causes the shaft to maintain for a while its maximum speed, and it then revolves more rapidly than the wheel C, in which case the hub with its pawl or pawls $a$ turns inside the wheel C over the ratchet-teeth $b$. By this means the irregularities of the speed at the source of power is compensated for and rendered more uniform at the point of utilization.

I am aware that a ratchet-clutch which has a fly-wheel on the driver-section of the clutch has been introduced in the train of mechanism of a sewing-machine. When, however, the fly-wheel is located on the driver-section of the clutch, the advantages which my invention secure cannot be obtained, since in my case the function of the fly-wheel is to continue the motion of the driven mechanism after the driver-section of the clutch is inactive or slower than that of the driven mechanism. The location of the fly-wheel on the driven side of the clutch is therefore very important, since it continues the motion of the driven machinery without requiring it to turn all of the machinery back of the clutch or between it and the source of power.

Having thus described my invention, what I claim as new is—

A train of mechanism between the source of power and point of utilization, consisting of a shaft, B, a driving-wheel, C, loose on the shaft, a clutch-hub fixed rigidly on the shaft and connected to the drive-wheel by ratchet and pawls, and a fly-wheel rigidly fixed on the shaft between the clutch and the point of utilization of the power, substantially as described.

CHRISTIAN ROWLAND.

Witnesses:
M. WOLF,
A. W. HOSTETTER.